March 10, 1953 M. MARON 2,631,199

DIRECT CURRENT BALANCE ADJUSTMENT

Filed Sept. 23, 1950

INVENTOR.
MEYER MARON
BY Darby & Darby
ATTORNEYS

Patented Mar. 10, 1953

2,631,199

UNITED STATES PATENT OFFICE 2,631,199

DIRECT CURRENT BALANCE ADJUSTMENT

Meyer Maron, Passaic, N. J., assignor to Allen B. Du Mont Laboratories, Inc., Clifton, N. J., a corporation of Delaware Application September 23, 1950, Serial No. 186,473

4 Claims. (Cl. 179—171)

1

The present invention is concerned with improvements in circuits particularly adapted for use in cathode-ray oscillographs.

As is well known, cathode-ray oscillographs form an important tool in the indication of electrical phenomena by giving a visual portrayal of certain electrical characteristics. It is important that such oscillographs be adapted for use with direct current or relatively low frequency input signals. This requirement necessitates the use of direct current amplifiers to increase the amplitude of input signals to a value which can readily operate the cathode-ray tube indicator of the oscillograph. The use of such direct current amplifiers introduces a number of problems because such amplifiers are inherently unstable particularly with respect to their zero level condition. It will be understood that indications on the oscillograph are derived by deflection of the cathode-ray beam spot from a datum position, usually designated as the zero level. Hence any random deviation in the zero level will correspondingly create inaccuracies in the indication. It has therefore become customary to utilize balanced amplifiers which help to minimize this zero level instability of such oscillographs. However, most signals which it may be desired to indicate utilize ground level as the datum for potential. Such signals are not easily adapted for use with balanced amplifiers and hence require a form of coupling adapted to be excited by the input signal to produce suitable balanced output signals to be supplied to the conventional balanced amplifier. At the same time it is important to be able to suitably adjust the zero level or normal beam position of the oscillograph.

The present invention is particularly directed toward improvements in such coupling circuits which include simplified zero level adjusting means. In particular the present invention utilizes a pair of cathode follower tubes with a special coupling, one of these tubes being excited by the input signal and both tubes providing a balanced output suitable for use with subsequent balanced amplifiers.

Figure 1:
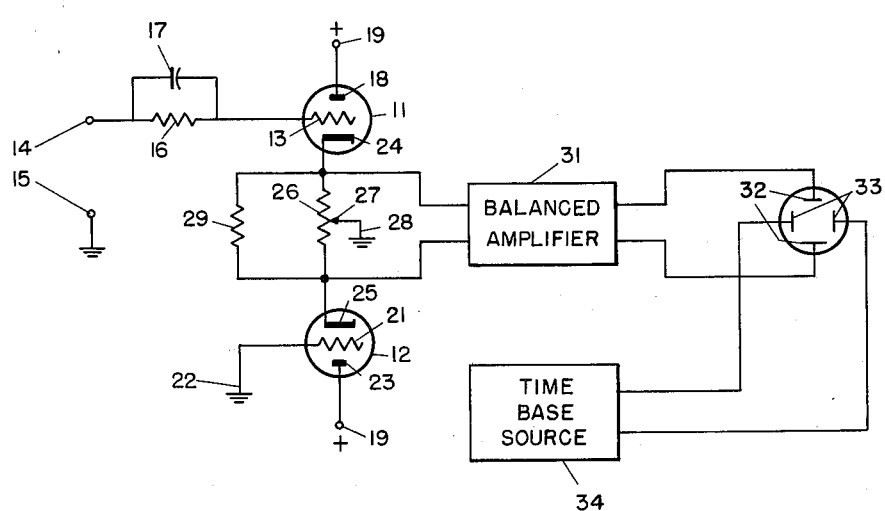

The objects and advantages of the present invention will become more apparent from consideration of the following description of a preferred embodiment of the invention, taken in conjunction with the appended drawing in which:

Figure 1 is a schematic circuit diagram partly in block form of a preferred form of the invention; and

2

Figure 1A:
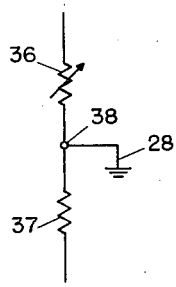

Figure 1(A) shows a modification of one portion of the circuit of Figure 1.

Referring to Figure 1 of the drawing, the present invention comprises a pair of electron tubes 11 and 12, illustrated as of the triode type, although it will be understood that the present invention is not limited to the use of triodes since other tube types may also be utilized. The control grid 13 of tube 11 is excited by the input signals applied to the input terminals 14 and 15. As shown, terminal 15 is grounded, while terminal 14 is connected to grid 13 through a resistor 16, shunted by a condenser 17. The anode 18 of tube 11 is connected directly to a suitable source 19 of positive potential. Source 19 may be a conventional plate voltage supply. The control grid 21 of tube 12 is grounded as at 22, and the anode 23 of tube 12 is also connected to the positive potential source 19. The cathodes 24 and 25 of respective tubes 11 and 12 are connected to the fixed terminals of a potentiometer 26 whose adjustable tap 27 is grounded at 28. A coupling resistor 29 also connects the cathodes 24 and 25. The balanced output from tubes 11 and 12 is derived from their cathodes 24 and 25, and this output is supplied to a suitable balanced amplifier 31 of any desired type or number of stages whose output is then supplied to one set of deflecting plates 32 of a cathode-ray tube. In the present instance this is illustrated as the vertical deflecting plates, although it will be understood that the present invention can be applied equally well to the horizontal deflecting plates where desired. In the present illustration the horizontal deflecting plates 33 are excited by suitable potentials illustrated as derived from a time base source 34, which may, for example, be a conventional linear sweep circuit or a source of sinusoidal voltage or any other desired signal.

In operation, with zero input signal supplied to terminals 14 and 15, tap 27 of potentiometer 26 is adjusted to provide substantially equal potentials for the two cathodes 24 and 25. This gives a true balanced condition such that the voltage applied to the plates 32 of the cathode-ray tube is the zero level voltage. If any adjustment of the zero level position is desired, this can be readily accomplished by the adjustment of tap 27. Upon supplying an input signal to terminals 14 and 15, the cathode current of tube 11 will be altered correspondingly, whereby the potential of the cathode 24 will be a facsimile of the input signal. At the same time the potential of the cathode 24 is supplied to the cathode 25 by the resistor 29. Since grid 21 is grounded at 22, the signal between cathode 25 and grid 21 is of opposite polarity from that between cathode 24 and grid 13. This may be most clearly shown from the following illustration. If the signal at terminals 14 and 15 is a direct current step signal which makes the control grid 13 more positive, tube 11 will draw more current thereby increasing the voltage drop between cathode 24 and ground 28, and the potential of cathode 24 will rise and become more positive. Resistor 29 correspondingly tends to make cathode 25 more positive, which makes grounded grid 21 more negative relative to cathode 25. This in turn reduces the current flow through tube 12 and reduces the potential of cathode 25. Resistor 29 is made larger in resistance value than potentiometer 26, so that the potential of cathode 25 under these circumstances is caused to decrease below zero signal value. As a result the input signal increases the potential of cathode 24 and decreases the potential of cathode 25, whereby a balanced output is obtained from cathodes 24, 25 suitable for exciting the subsequent amplifier 31.

Resistor 16 is a grid current limiting resistor which serves to protect the tube 11 and subsequent tubes from damage due to positive signal swings. Condenser 17 preserves the high frequency response of the system.

It will be understood that in place of potentiometer 26 there may be inserted a series connected variable resistor 36 and resistor 37, as shown in Figure 1(A). Their junction 38 is grounded at 28 as was tap 27 in Figure 1. The device of Figure 1(A) will serve to adjust the zero level or balance in the same manner as potentiometer 26, but does so by increasing or decreasing the current flow in only one of the two tubes instead of adjusting both tubes as is done in Figure 1.

Thus the present invention has provided a simple direct current circuit for coupling an unbalanced signal to a balanced amplifier, while permitting ready adjustment of the balance condition or zero level adjustment.

Although the invention has been described with respect to a preferred embodiment, it will be understood that variations of the circuit may be made without departing from the spirit and scope of the invention which is defined in the appended claims.

What is claimed is:

1. A direct current amplifier circuit for oscillographs or the like comprising a pair of electron tubes each having a cathode, a grid and an anode, a source of positive potential connected directly to each of said anodes, means for impressing an input signal on one of said grids the other of said grids being grounded, means providing a resistance between each of said cathodes and ground, the resistance between at least one of said cathodes and ground being adjustable to adjust the balance of the outputs from said tubes, a resistor directly connecting said cathodes for transferring signal potentials from one of said cathodes to the other independently of said resistance providing means, and directly coupled to said cathodes to derive a balanced output therefrom.

2. A circuit as in claim 1 wherein said resistance providing means comprises a potentiometer having a grounded variable tap.

3. A circuit as in claim 1 wherein said resistance providing means comprises two series-connected resistors, at least one being variable and their junction being grounded.

4. A circuit as in claim 1 wherein said resistor has greater resistance than said resistance providing means.

MEYER MARON.

REFERENCES CITED

The following references are of record in the file of this patent:

UNITED STATES PATENTS

| Number | Name | Date |
|---|---|---|
| 2,070,071 | Stromeyer | Feb. 9, 1937 |
| 2,208,254 | Geohegan | July 16, 1940 |
| 2,240,635 | Avins | May 6, 1941 |
| 2,310,342 | Artzt | Feb. 9, 1943 |
| 2,329,073 | Mitchell et al. | Sept. 7, 1943 |
| 2,432,142 | Dehmel | Dec. 9, 1947 |
| 2,462,849 | Dishal et al. | Mar. 1, 1949 |
| 2,471,449 | Reade et al. | May 31, 1949 |
| 2,529,459 | Pourciao et al. | Nov. 7, 1950 |
| 2,562,006 | Wheeler | July 24, 1951 |

FOREIGN PATENTS

| Number | Country | Date |
|---|---|---|
| 584,191 | Great Britain | Jan. 9, 1947 |